Figure 1:
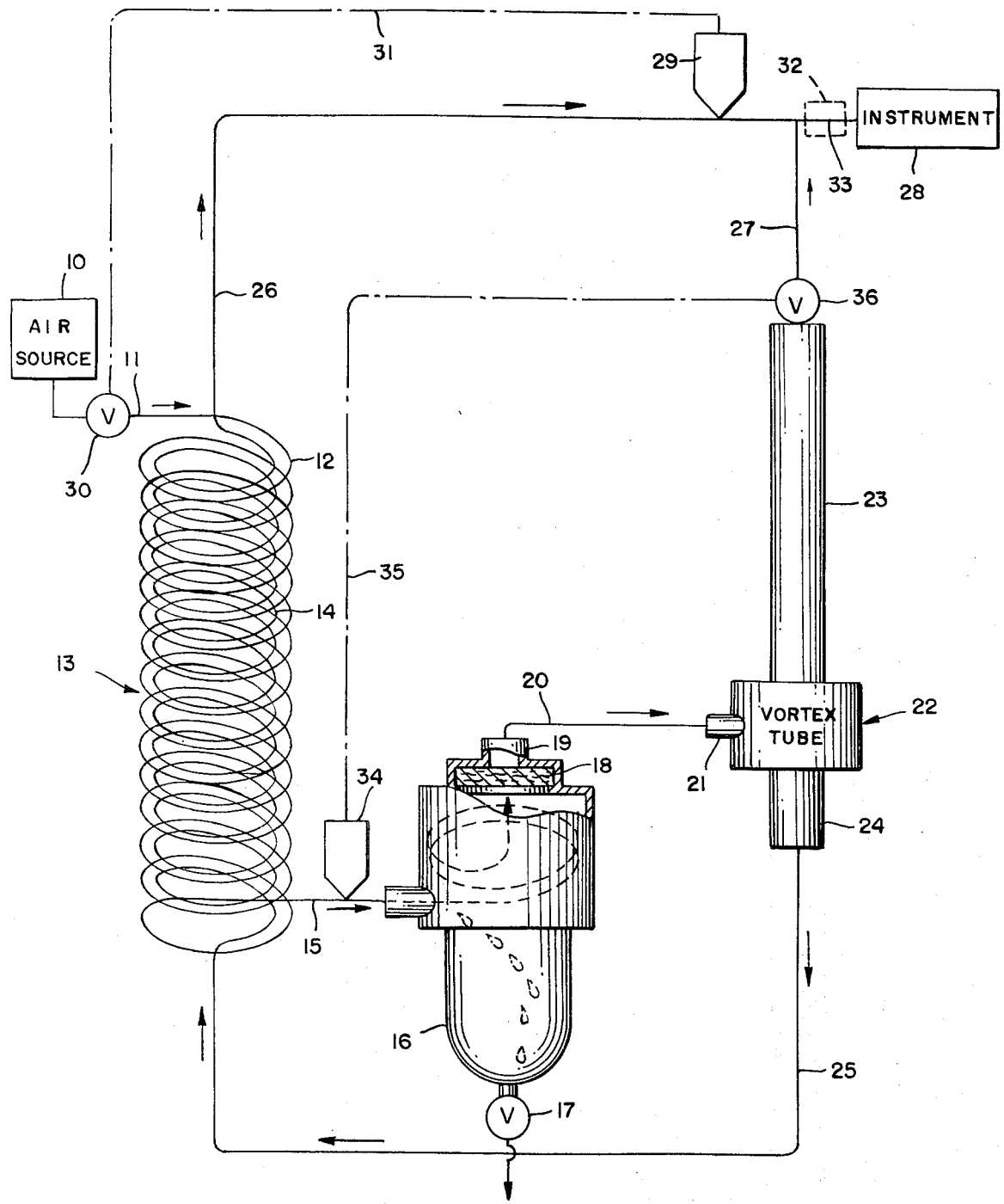

United States Patent [19]
Inglis

[11] 3,815,375
[45] June 11, 1974

[54] PRESSURE REGULATING REFRIGERATIVE AIR DRYER SYSTEM

[75] Inventor: Leslie R. Inglis, Cincinnati, Ohio

[73] Assignee: Vortec Corporation, Cincinnati, Ohio

[22] Filed: July 6, 1973

[21] Appl. No.: 376,936

[52] U.S. Cl. .................................................. 62/5
[51] Int. Cl. ........................................... F25b 9/02
[58] Field of Search .......................................... 62/5

[56] References Cited
UNITED STATES PATENTS

| | | | |
|---|---|---|---|
| 2,522,787 | 9/1950 | Hughes | 62/5 |
| 2,741,899 | 4/1956 | Von Linde | 62/5 |
| 2,971,342 | 2/1961 | Pilcher | 62/5 |
| 3,460,373 | 8/1969 | Ford | 62/5 |

*Primary Examiner*—William J. Wye
*Attorney, Agent, or Firm*—Dawson, Tilton, Fallon & Lungmus

[57] ABSTRACT

A highly efficient and relatively simple refrigerative dryer system for removing moisture from pressurized air while simultaneously reducing the pressure of that air to a regulated level suitable for operating various instruments, such as control instruments used in heating and air conditioning equipment or other instruments incorporating fluidic elements. The system includes a vortex tube which utilizes the difference in line pressure and instrument (discharge) air pressure to cool the inlet air and, in conjunction with a conventional separator, to remove moisture from the cooled air before it enters the vortex tube. Air pressure downstream of the vortex tube is monitored and, if it exceeds a predetermined level, the flow of inlet air is interrupted by suitable valve means coacting with the pressure sensing device until the downstream pressure again drops below the predetermined level. In one embodiment, the system also includes a thermal sensor, operating in combination with a control valve near the vortex tube's hot end, for insuring that the temperature of cooled air entering the separator will not drop below a minimum preselected level.

11 Claims, 1 Drawing Figure

PRESSURE REGULATING REFRIGERATIVE AIR DRYER SYSTEM

BACKGROUND

Industrial compressed air systems usually supply air at pressures of 80 to 110 pounds per square inch gauge (psig). As a result of the compression of air, which heats it, and the subsequent cooling of that air, water is condensed at many points in such a system. While centrifugal separators are commonly used to remove liquid water as well as particulate matter, the air leaving such a separator is still saturated with water vapor. In other words, a conventional separator is incapable of condensing water vapor from the air flowing therethrough.

The air used for the control systems of heating and air conditioning equipment, and for other types of instruments, must be relatively clean and dry. Also, such "instrument air" is normally of relatively low pressure, usually about 10 to 25 psig. Pressure reducing valves are customarily used to regulate the pressure down to an acceptable level and, in order to dry the air, an ordinary refrigerative or chemical dryer is customarily positioned in advance of the regulating valve.

As is well known, standard refrigerative dryers generally employ a conventional refrigerating machine which almost always uses Freon as a refrigerant. Such refrigerative dryers are relatively heavy, expensive, and bulky. Chemical dryers, whether they be of the heat-reactivated, regenerative, or deliquescent type, have similar disadvantages and, in addition, require periodic cleaning and replacement of the desiccant charge.

Vortex tubes and their principles of operation are now quite well known. The basic concept is disclosed in U.S. Pat. Nos. 1,952,281 and 3,208,229. While vortex tubes have been employed in a variety of refrigerative applications, such tubes have not heretofore been used, or described as being suitable for use, in automated systems for simultaneously drying and reducing the pressure of air for the operation of instruments.

Other patents illustrative of the prior art are U.S. Pat. Nos. 2,741,899, 2,683,972, 2,971,342, 3,129,075, 3,319,347, and 3,460,373.

SUMMARY

An important object of this invention lies in providing a compact, relatively inexpensive, and highly efficient system for simultaneously reducing the pressure of air from a conventional industrial compressed air source to a regulated level and removing moisture from such air, thereby providing a monitored stream of clean dry air at a pressure which does not exceed a predetermined maximum level for use in the operation of control devices and other instruments. The relatively low pressure air, sometimes called "instrument air" may be used for the operation of heating and air conditioning controls, dental handpieces, and a wide variety of other types of instruments requiring pressurized air which is both clean and dry.

Another aspect of this invention lies in providing a system which is self-regulating to maintain the discharge pressure near a predetermined level, thus providing the instrument with a relatively constant pressure air supply regardless of varying downstream demands or fluctuations in inlet (line) pressure. In that connection, it is a particular object to provide a system in which the valve or valves for controlling the flow of air are disposed and arranged so that dangers of malfunctioning because of moisture accumulation, especially ice formation, are substantially eliminated.

The system also includes means for monitoring the temperature of the air at the cold air discharge end of the heat exchanger, and for automatically adjusting or altering operation of the vortex tube, should the temperature of such air be reduced to a point where water might condense as ice which might in turn clog the system.

Briefly, the system includes a heat exchanger having channels for the passage of air in opposite directions and on opposite sides of a thermally conductive wall. One pass or channel of the exchanger communicates with an ordinary industrial compressed air line which supplies air saturated with water vapor at relatively high pressure. As the air travels through the first pass of the exchanger, it is cooled to a temperature within the range of 33° to 36° F. by cold air counterflowing in the second channel or pass of the exchanger. Cooling of the pressurized inlet air causes water vapor to condense and the mixture of cold air and water enters a separator which extracts the condensed water from the cold air stream. The air, then dry and still cold, and under relatively high pressure, enters the inlet of a vortex tube which separates the air into two streams at lower pressure. The stream discharged from the cold end of the vortex tube is directed to the second pass of the heat exchanger where it cools the incoming air and is itself heated to within a few degrees of ambient temperature. The warmed dry air flowing from the second pass of the exchanger is then combined with the dry air discharged from the hot end of the vortex tube and is conveyed to a suitable instrument requiring for its operation a source of clean dry air at reduced pressure. Proper pressure for the instrument air is maintained by a pressure sensing device located in the line downstream of the vortex tube, the sensing device coacting with a suitable valve positioned before the inlet of the vortex tube and, more desirably, in advance of the first pass of the heat exchanger. Such valve is responsive to changes in pressure detected by the sensing means to interrupt the supply of relatively high pressure air until the pressure of delivered air is reduced to a preselected level.

The system also includes a valve located at the hot end of the vortex tube which is responsive to temperature sensing means positioned adjacent the cold air discharge end of the heat exchanger. Should the temperature of the air monitored by the temperature sensing means drop to a point where ice formation is likely, the valve at the vortex tube's hot end is partially or fully closed, thereby reducing or interrupting the refrigerating action of the vortex tube until the sensed temperature of the cold air passing from the heat exchanger returns to an acceptable level.

The result is a compact, efficient, and relatively inexpensive system for regulating industrial air to a pressure suitable for instrument operation and for simultaneously removing moisture from that air. The system is not only relatively uncomplicated and reliable but requires no electrical power for purposes of refrigeration. If desired, the automatic controls may be non-electrical, with the result that the entire system operates only on the availability of energy in the compressed air which it receives. Since the air discharged from opposite ends of the vortex tube is ultimately recombined to produce the stream of dry clean instrument air, no air is wasted at any time during operation of the apparatus.

Other objects and advantages will appear as the specification proceeds.

DRAWINGS

The FIGURE of the drawing is a schematic and partially diagrammatic illustration of a refrigerative air drying system embodying the invention.

DESCRIPTION

In the system illustrated in the FIGURE, the numeral 10 generally designates a source of compressed air which communicates through line 11 with the first pass or channel 12 of a heat exchanger 13. As the relatively high pressure industrial air, normally of a pressure within 80 to 110 psig, passes along channel 12 it is cooled by cold air passing in the opposite direction through a second channel or pass 14 of the same exchanger. In the drawings, the exchanger is diagrammatically shown as a pair of parallel coils but it is to be understood that in actual practice the respective channels would be separated by a thin wall of metal or other heat-conductive material. A concentric tube construction, in which the larger-diameter tube carries the incoming pressurized industrial air and the smaller-diameter inner tube disposed within the larger tube carries the dry cooling air, has been found particularly effective. Since in any event the double-pass counterflow heat exchanger is entirely conventional in construction, and since such heat exchangers are well known in the art, further description is believed unnecessary for purposes of describing the present invention.

The action of cooling the air while under high pressure as it passes through channel 12 of the heat exchanger causes water vapor in the air to condense into liquid water. For example, air entering the heat exchanger saturated at 100 psig and 70° F. will contain 13.8 grains of water vapor per pound of dry air. Upon cooling to 35° F. with the pressure still at 100 psig, it will contain only slightly less than 4 grains of water vapor per pound of dry air. The difference, nearly 9 grains per pound of air (65 percent of all the moisture) is condensed and forms as liquid water on the inside walls of channel 12, part of it being entrained in the air stream as water droplets.

The cold air outlet of channel 12 communicates with passage or conduit 15 which leads to separator 16. The cold air and the condensed water enter the separator tangentially and are caused to spin rapidly by the generally cylindrical internal configuration of the unit. Water particles, as well as particulate matter, are thrown outwardly under the influence of centrifugal force and impinge on the walls of the separator, finally draining downwardly into the lower end of the bowl where they are periodically drained by operation of a suitable valve 17. The valve may be manually operated or, if desired, may be designed to open automatically when the level within the sump or bowl of the separator reaches a predetermined point. The relatively dry cold air, still at full line pressure, is discharged from the separator through filter 18 and outlet 19. Centrifugal separators of the type described, as well as other types of separators capable of performing similar functions, are commercially available and, since their structure and operation are known in the art, further description is believed unnecessary herein.

Cold dry air discharged from outlet 19 passes through conduit 20 to the inlet 21 of vortex tube 22. The vortex tube is of well-known construction; it may, for example, take the form of the tube illustrated and described in U.S. Pat. No. 3,208,229. The action of the vortex tube separates the cold pressurized dry air into two streams of lower pressure. One fraction is discharged upwardly from the hot end portion 23 of the tube; the other is discharged downwardly from the tube's cold end. As is known in the art, the hot and cold end temperatures of air discharged from a vortex tube may be varied over a wide range by changing the restriction at the tube's hot end. Experience has shown, however, that maximum refrigeration is produced at 60 percent cold fraction, that is, when the flow of air from the cold end is approximately 60 percent of the total flow discharged from the tube. Thus, in the simplest form of the invention, the vortex tube 22 would be equipped with a fixed hot end restriction (not shown) sized to provide a 60 percent cold fraction. In addition, the tube 22 is selected and dimensioned so that the pressure of cold (approximately −20° to −35° F.) air discharged from end 24, is of reduced pressure within the range of 10 to 25 psig. Examples of vortex tubes capable of producing such results (i.e., 100 psig, 35° F. inlet; 15 psig outlet and 60 percent cold fraction) are commercially available as vortex tube Models 106 and 208 (Vortec Corporation, Cincinnati, Ohio).

The air leaving the cold end 24 of the vortex tube is carried by passage or conduit 25 to the inner pass 14 of the heat exchanger where it cools the incoming pressurized air (i.e., the air flowing downwardly through channel 12) and, at the same time, is itself heated by the incoming air so that when the dry air enters passage 26 at the upper discharge end of the heat exchanger such air is warmed to nearly the same temperature as the inlet air. Passage 26 joins passage 27, the latter communicating with the hot air discharge end 23 of the vortex tube, to combine the two streams of clean dry air and to deliver such air at reduced pressure (i.e., 10 to 25 psig) to the instrument diagrammatically represented in the drawing and designated generally by numeral 28.

The pressure regulating function of the invention is provided by pressure sensing means 29 which is arranged to sense pressure downstream of vortex tube 22 and which is operatively connected to valve means 30 located upstream of the vortex tube. While the valve 30 might, for example, be interposed along line 20 adjacent the vortex tube, a particularly effective location is shown in the drawings, namely, directly in advance of the first pass of heat exchanger 13. In the illustrated arrangement, valve 30 is not exposed to temperature fluctuations which might occur elsewhere in the system. In addition, valve 30 requires no thermal insulation in the position shown. Pressure sensing means 29, which may take the form of a pressure-operated switch, is actuated when the pressure downstream of the vortex tube exceeds a predetermined level. As indicated above, the pressure of air discharged from the hot and cold ends of vortex tube 22 is relatively constant as long as the pressure of air supplied to that tube remains constant.

If the air supplied to the vortex tube should for any reason increase in pressure, a resulting increase in the pressure of air discharged from the tube, if it reached a predetermined level, would actuate sensing means 29 which in turn would actuate valve 30 to interrupt the flow of pressurized air through passage 11. In addition, changes in demand of the downstream instruments can cause changes in pressure detected by sensing means 29 which in turn will operate valve means 30 in a manner which tends to restore the predetermined level of downstream pressure at the sensing means. Thus, regulation of the downstream pressure level is provided by compensating for changes in that level resulting from both upstream pressure changes and downstream demand changes.

It is important that valve 30 be of the non-modulating type; that is, it is either open or closed. The purpose is to insure that the full available pressure difference is applied to the vortex tube, since any modulating at that point would destroy some of the available refrigeration obtainable from the vortex tube.

Sensing means 29 may be of any well known mechanical or electrical type. Similarly, valve 30 may be solenoid-operated or, alternatively, may be operated pneumatically. Line 31, which constitutes part of the sensing means, may be an electric line or, in the case of a pneumatic system, may be a fluid-containing line extending between the pressure sensing point or tap and a pneumatically-operated valve 30. Where valve 30 is electrically-operated, it should be of the normally closed type, with electric power required to keep it open, so that when the system is not in use the valve will automatically shut off the supply of compressed air to the entire system. As an example of the operation of controlling outlet pressure, vortex tube 22 may as already described discharge air at a pressure of about 15 psig. If instrument 28 is designed to operate at a pressure of 15 psig, and in any case at a pressure not exceeding 16 psig, then sensor switch 29 may be set, or may be selected, to open at a sensed pressure of 16 psig, thereby deenergizing solenoid valve 30 which automatically closes and thereby interrupts the inflow of pressurized air.

It will be understood that the pressure regulating functions of this system normally require frequent operation of valve 30. It will be further understood that certain combinations of system capacity and downstream demand may cause undesirably rapid cycling of that valve. To prevent such rapid cycling an accumulator tank or chamber represented by broken lines 32 in the drawings may be interposed along the outlet line 33 of the system.

In the embodiment illustrated in the drawing, the system also includes a temperature sensing means for sensing the temperature of pressurized air passing through passage 15 in advance of separator 16. Line 35 (which is part of the temperature sensing means) operatively couples sensor 34 with valve 36 adjacent the hot end of the vortex tube. Sensor 34 is activated, and valve 36 is closed, whenever the temperature of air in passage 15 drops below a selected temperature within the range of approximately 33° to 36° F. The optimum temperature of the air flowing through passage 15 is believed to be about 35° F. If it is allowed to get significantly colder than that, water condensed in line 15 will turn to ice and may clog the system. Assuming that sensor 34 is actuated at any temperature below 35° F., should the air in passage 15 drop below that temperature, valve 36 fully or partially closes to block or reduce the flow of air from the vortex tube's hot end. If the flow through valve 36 is completely blocked, then the refrigerative action of the vortex tube completely stops, whereas if such flow is simply reduced, then the cold outlet temperature of the tube is correspondingly increased. In either case, the temperature of the air through the second pass 14 of the heat exchanger rises until the temperature of pressurized air flowing through passage 15 exceeds 35° F., at which time valve 36 returns to its fully opened condition and optimal vortex cooling is resumed.

Valve 36 may be either modulating or non-modulating in operation and may be either electrically or mechanically operated. Thermal sensor 34 may take the form of a bulb containing a liquid which expands and contracts with changes in temperature and which is transmitted through tube 35 to operate valve 36, or it may take the form of a thermostatic switch, in which case line 35 constitutes an electrical connection between the switch and solenoid valve 36.

While in the foregoing I have disclosed an embodiment of the invention in considerable detail for purposes of illustration, it will be understood by those skilled in the art that many of these details may be varied without departing from the spirit and scope of the invention.

I claim:

1. A system for converting a stream of compressed air saturated with water vapor into a stream of relatively dry air at lower regulated pressure suitable for instrument operation, comprising a vortex tube having a high pressure air inlet and having a pair of outlets for hot and cold air discharged at lower pressure, a heat exchanger having first and second air flow channels in heat exchanging relation, passage means connecting said cold air outlet of said vortex tube with the inlet of said second channel of said exchanger, passage means connecting the outlet of said second channel with the hot air outlet of said vortex tube to combine the streams of air therefrom for delivery to an instrument requiring pressure-regulated dry air, said first channel of said exchanger having an inlet receiving relatively high pressure air saturated with water vapor and having an outlet discharging air at substantially the same high pressure but cooled by the flowing air in said second channel, separator means for removing liquid water from pressurized air, passage means connecting an inlet of said separator with the cold air outlet of said first channel of said exchanger and connecting an air outlet of said separator with the inlet of said vortex tube, pressure sensing means connected along one of said passage means downstream of said vortex tube for sensing the pressure of air therein, and a non-modulating valve disposed in one of said passage means upstream of said vortex tube, said valve being operatively connected to said sensing means for interrupting said upstream flow when said sensing means senses a pressure above a predetermined maximum instrument-air pressure level and for restoring said upstream flow when the pressure detected by said sensing means drops below said predetermined level.

2. The system of claim 1 in which said valve is interposed in passage means for conveying relatively high pressure air to said first channel of said exchanger.

3. The system of claim 1 wherein said sensing means and said valve coact to interrupt the upstream flow of pressurized air to said vortex tube when the pressure of said downstream flow exceeds a preselected pressure within the range of 10 to 25 psig, and where said relatively high pressure air is supplied at a pressure within the range of approximately 80 to 110 psig.

4. The system of claim 1 in which said valve includes a pneumatic operating means and said sensing means includes a pneumatic line communicating with the operating means of said valve and tapping into said one of said passage means downstream of said vortex tube for transmitting pressure from said passage means to said pneumatic operating means.

5. The system of claim 1 in which said valve is solenoid-operated and said sensing means comprises a pressure-operated switch electrically connected to said solenoid-operated valve.

6. The system of claim 5 in which said solenoid-operated valve remains in open condition when the solenoid thereof is energized and in which said switch opens to deenergize said solenoid when the sensed pressure exceeds a selected level within the range of approximately 10 to 25 psig.

7. The system of claim 1 wherein temperature sensing means is interposed along said passage means between said first channel of said exchanger and said separator means, and a second valve disposed in one of said passage means downstream of said vortex tube adjacent the hot end of said tube, said second valve being operatively connected to said sensing means for controlling the flow of air from the hot end of said vortex tube when the temperature of air sensed by said temperature sensing means exceeds or drops below a preselected level within the range of 33° to 36° F.

8. The system of claim 7 in which said second valve is a modulating valve which automatically increases the extent of flow restriction in relation to the extent to which the temperature detected by said temperature sensing means drops below said preselected level.

9. The system of claim 7 in which said second valve is an open-closed non-modulating valve.

10. The system of claim 9 wherein said non-modulating second valve is solenoid-operated, said temperature sensing means comprising a thermostatic switch electrically connected to said solenoid valve.

11. The system of claim 7 in which said temperature sensing means includes mechanical means responsive to temperature changes and operatively connected to said second valve for directing the same between open and closed positions as the sensed temperature rises above and falls below said preselected level.

* * * * *